US005190409A

United States Patent [19]

Hall

[11] Patent Number: 5,190,409

[45] Date of Patent: Mar. 2, 1993

[54] BURIED CABLE REMOVAL APPARATUS

[76] Inventor: Ronald H. Hall, 161 Argyle Street, Embro, Ontario, Canada, N0J 1J0

[21] Appl. No.: 846,715

[22] Filed: Mar. 6, 1992

[51] Int. Cl.[5] .......... F16L 1/00

[52] U.S. Cl. .......... 405/154; 37/98; 405/174; 405/177

[58] Field of Search .......... 405/180, 174, 177, 175, 405/173, 156, 154; 37/98, 193

[56] References Cited

U.S. PATENT DOCUMENTS

| | | | |
|---|---|---|---|
| 2,386,615 | 10/1945 | Knapp | 405/173 X |
| 3,648,282 | 3/1972 | Kelly | 405/177 X |
| 4,018,058 | 4/1977 | Eichenseher et al. | 405/154 |
| 4,318,638 | 3/1982 | Ptomersberger et al. | 405/177 |
| 4,685,831 | 8/1987 | Mahoney | 405/156 |
| 4,744,696 | 5/1988 | Vidler | 405/180 |
| 5,090,141 | 2/1992 | Hall | 37/98 |

*Primary Examiner*—Dennis L. Taylor
*Attorney, Agent, or Firm*—R. Craig Armstrong

[57] ABSTRACT

Conventional cable-laying apparatus has been adapted for the removal of cable. A trenching plow blade is towed behind a bulldozer or the like. Mounted above the area of the blade is a powered cable-pulling assembly. Once an initial length of cable is excavated and routed to the cable pulling assembly, the equipment is advanced along the line of the cable to dig the trench, preferably just a small distance above the cable, such as about a foot, and the cable pulling assembly is driven to pull the cable from the ground behind the advanced blade. The cable may be routed to lie on the ground behind the advancing apparatus, or alternatively may be routed forward over the cab of the bulldozer onto a powered rewind reel. The cable pulling assembly includes a pulling wheel rotatably mounted to the blade support assembly, rotated by a hydraulic motor through a reduction gearbox. A series of rollers are mounted between two roller support arms. The roller support arms are connected to each other and pivotally mounted at one end to the blade support assembly, to rotate around a pivot pin. A hydraulic cylinder mounted between the blade support assembly and the roller support arms is operable to move the roller support arms to a closed position in which the rollers force the cable into the grooved portion of the pulling wheel, where teeth defined by the edges of squares rods into the cable to grip it securely for pulling.

4 Claims, 5 Drawing Sheets

BURIED CABLE REMOVAL APPARATUS

BACKGROUND OF THE INVENTION

This invention relates to apparatus for removing buried cable from the ground.

There is a huge amount of buried cable in the world. Occasionally, it becomes necessary or desirable to remove that cable, for replacement or otherwise. For example, in many parts of the world, old telephone cables are being replaced by fiber optic cables. The old cable has substantial value because of its copper content, and it is therefore highly desirable to remove it for that reason, as well as for environmental reasons.

Hitherto, there has been no truly effective way of removing substantial lengths of cable. The most common technique consists of digging a trench above the cable, using conventional trenching equipment, and then in a separate operation, digging down to the cable and lifting it out. This process is very laborious, and not much cable can be removed in the course of a day.

SUMMARY OF THE INVENTION

It is an object of the invention to provide apparatus which greatly facilitates removal of underground cable, by combining trenching and removal functions in one piece of equipment.

In the invention, conventional cable-laying apparatus has been adapted for the removal of cable. A trenching plow blade is towed behind a bulldozer or other suitable pulling means. Mounted above the area of the blade is a powered cable-pulling assembly. Once an initial length of cable is excavated and routed to the cable pulling assembly, the equipment is advanced along the line of the cable to dig the trench, preferably just a small distance above the cable, such as about a foot, and the cable pulling assembly is driven to pull the cable from the ground behind the advancing blade.

The cable may be routed to lie on the ground behind the advancing apparatus, or alternatively may be routed forward over the cab of the bulldozer onto a powered rewind reel.

Coordination of the cable pulling speed with the blade advancement speed is carried out so that the cable is pulled out behind the advancing blade. This coordination may be automated.

Since cable depth may vary, the blade depth preferably is adjustable. This function may also be automated.

The plow blade should remain in approximate alignment with the blade, so steering means for the blade should be provided. This function also may be automated.

In the preferred embodiment of the invention, the cable pulling is achieved by rotation of a grooved pulling wheel partially surrounded by rollers to create a pinch path. Teeth provided in the groove are forced into the cable by the rollers, so that the wheel can grab the cable to transmit large force without slipping, to pull the cable from the ground.

Further features of the invention will be described in greater detail below.

BRIEF DESCRIPTION OF THE DRAWINGS

The preferred and alternative embodiments of the invention will now be described in greater detail by way of example only, with reference to the accompanying drawings, in which.

DETAILED DESCRIPTION OF THE PREFERRED EMBODIMENT

In the invention, conventional cable-laying apparatus has been adapted for the removal of cable 1. A trenching plow blade 2 is towed behind a bulldozer 3 or other suitable pulling means. Mounted above the area of the blade is a powered cable-pulling assembly 4.

Figure 1:
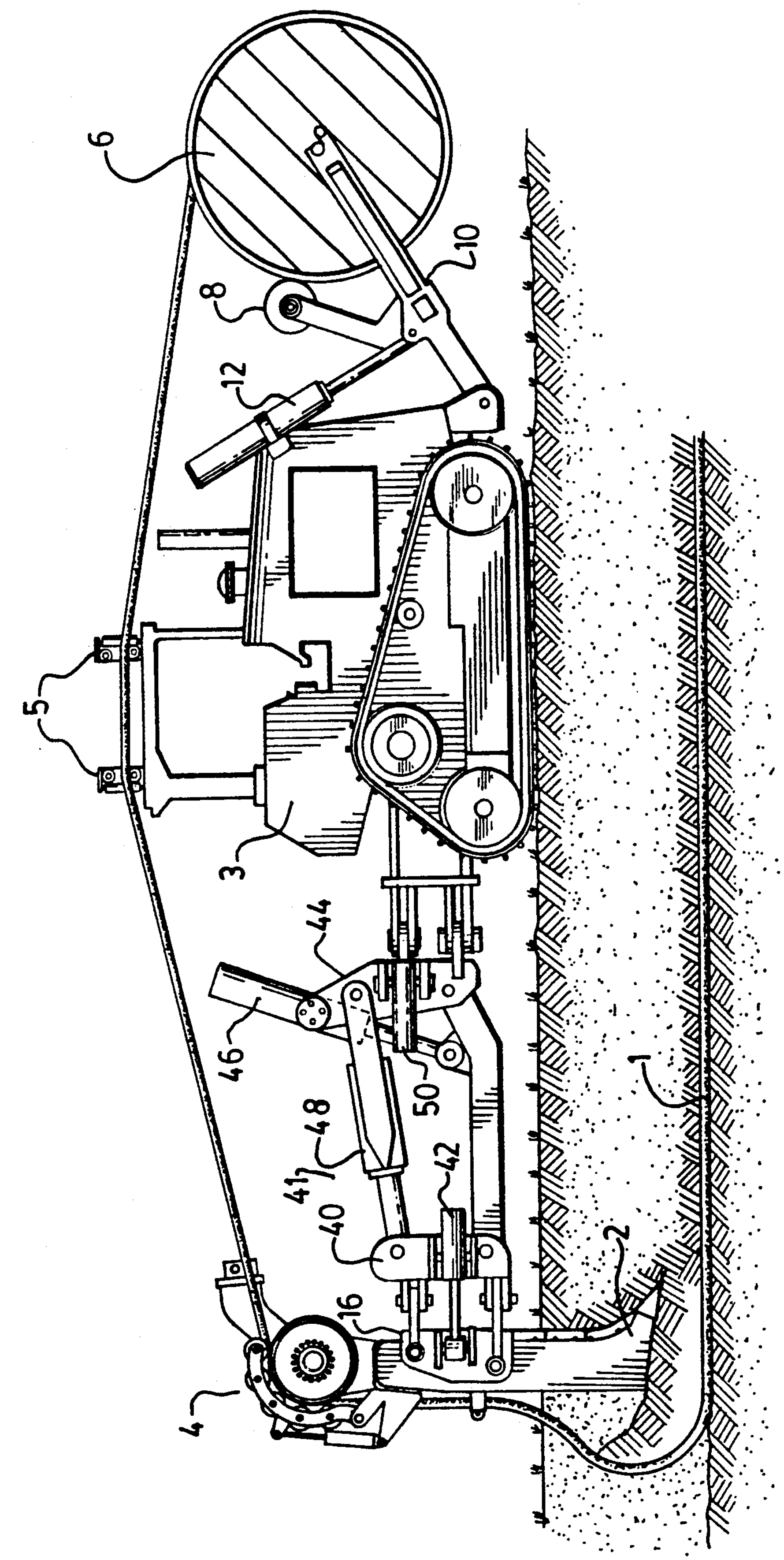
FIG. 1 is a side view of the apparatus, including a reel onto which the removed cable is wound.
Figure 2:
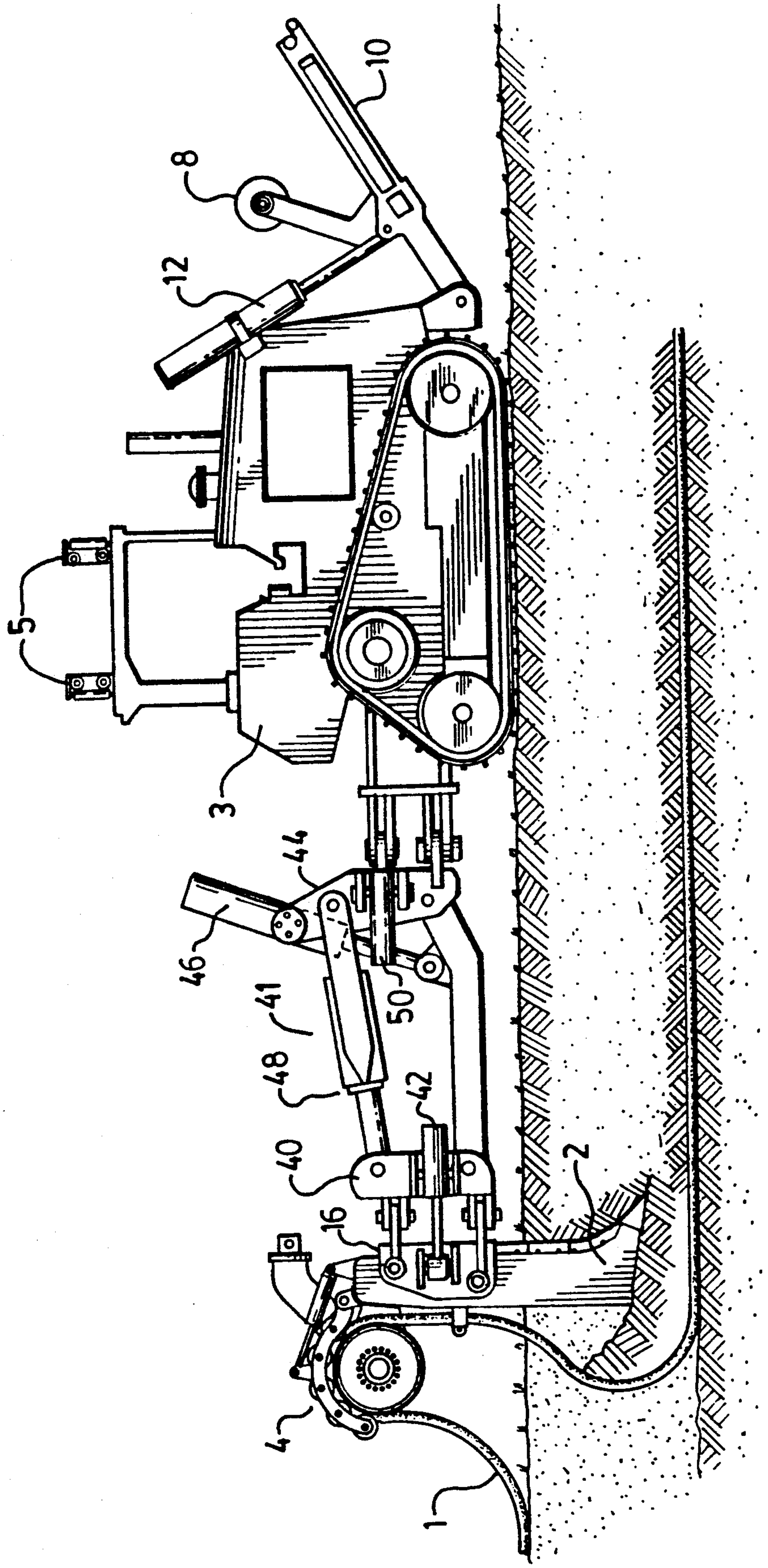
FIG. 2 is a side view of the apparatus, configured without a rewind reel.
Figure 3:
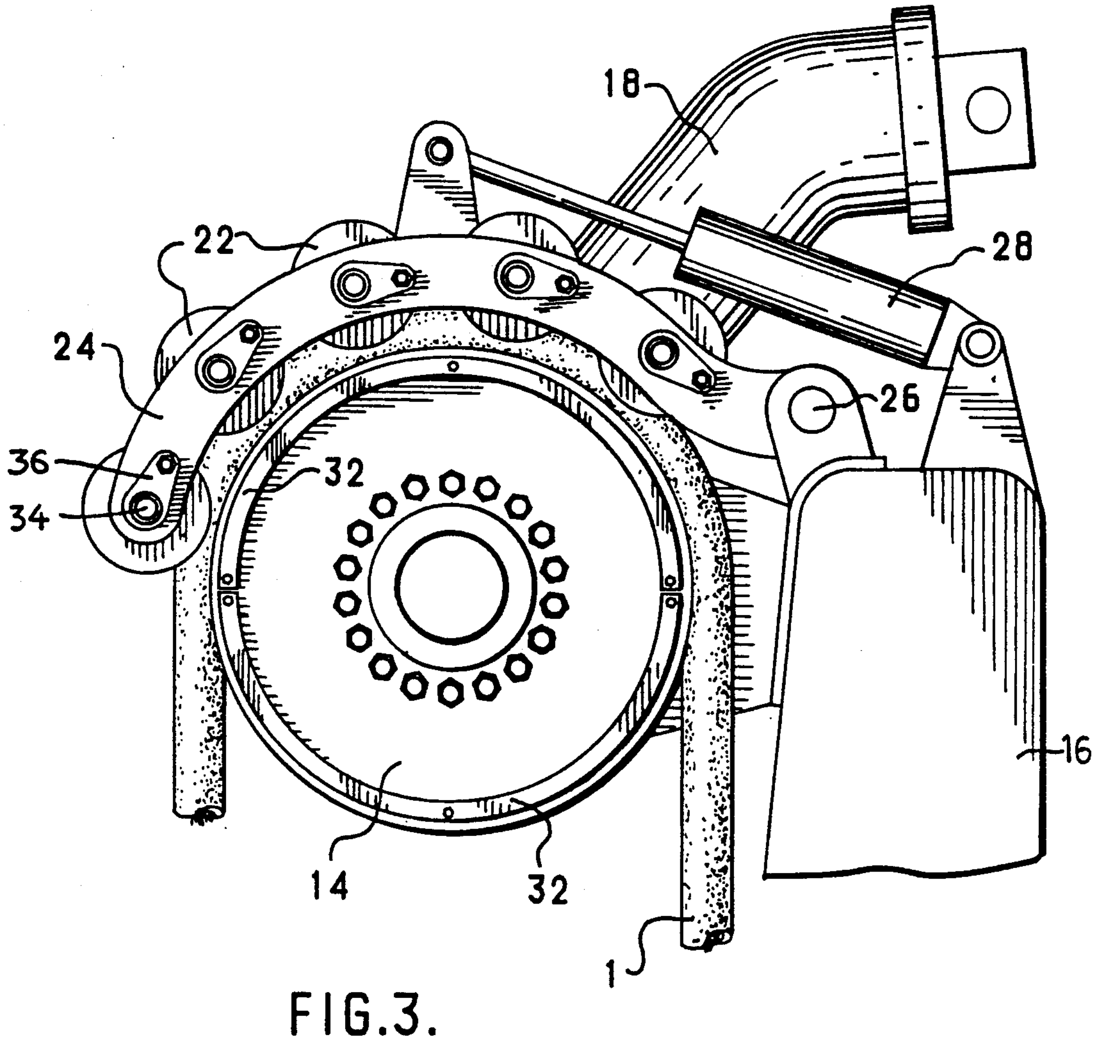
FIG. 3 is a side view of the cable pulling assembly.
Figure 4:
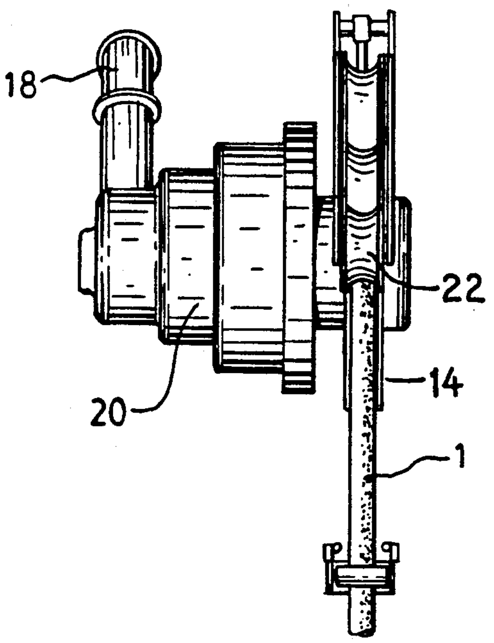
FIG. 4 is an end view of the cable pulling assembly.

The cable pulling assembly may be oriented to route the cable forward over the cab of the bulldozer via capstans 5, onto a rewind reel 6, as shown in FIG. 1, or to route the cable to simply lie on the ground behind the advancing apparatus, as shown in FIG. 2. The FIG. 1 apparatus is preferred from a functional viewpoint, but of course is inevitably more expensive than the FIG. 2 apparatus. The additional expense may of course be illusory, since it deals with the whole problem of removal, whereas the FIG. 2 embodiment still leaves the user with the expense of collecting the cable once it has been laid on the ground.

In the FIG. 1 embodiment, the rewind reel must be powered by means such as a hydraulic motor 8, since a certain amount of force is required to take up the slack in the cable from the cable pulling assembly, and then a fair amount of force may be required to bend the cable around the reel, particularly with large-diameter cable. The hydraulic motor 8 is not used to assist in pulling the cable from the ground, however; its function is strictly to rotate the reel 6 to wind the cable onto it.

The reel is mounted on carrier arms 10, which are pivotally connected to the front of the bulldozer and are moveable up and down via hydraulic cylinders 12 for loading and unloading.

As illustrated in FIGS. 3 to 8, the cable pulling assembly 4 includes a pulling wheel 14 rotatably mounted to the blade support assembly 16. The pulling wheel is rotated via a hydraulic motor 18, through a 78:1 reduction gearbox 20.

A series of rollers 22 are mounted between two roller support arms 24. The rollers are mounted on shafts 34 which are held in place by flanges 36 welded to one end thereof and then bolted to the support arms. Bushings 38 are used rather than bearings.

Figure 5:
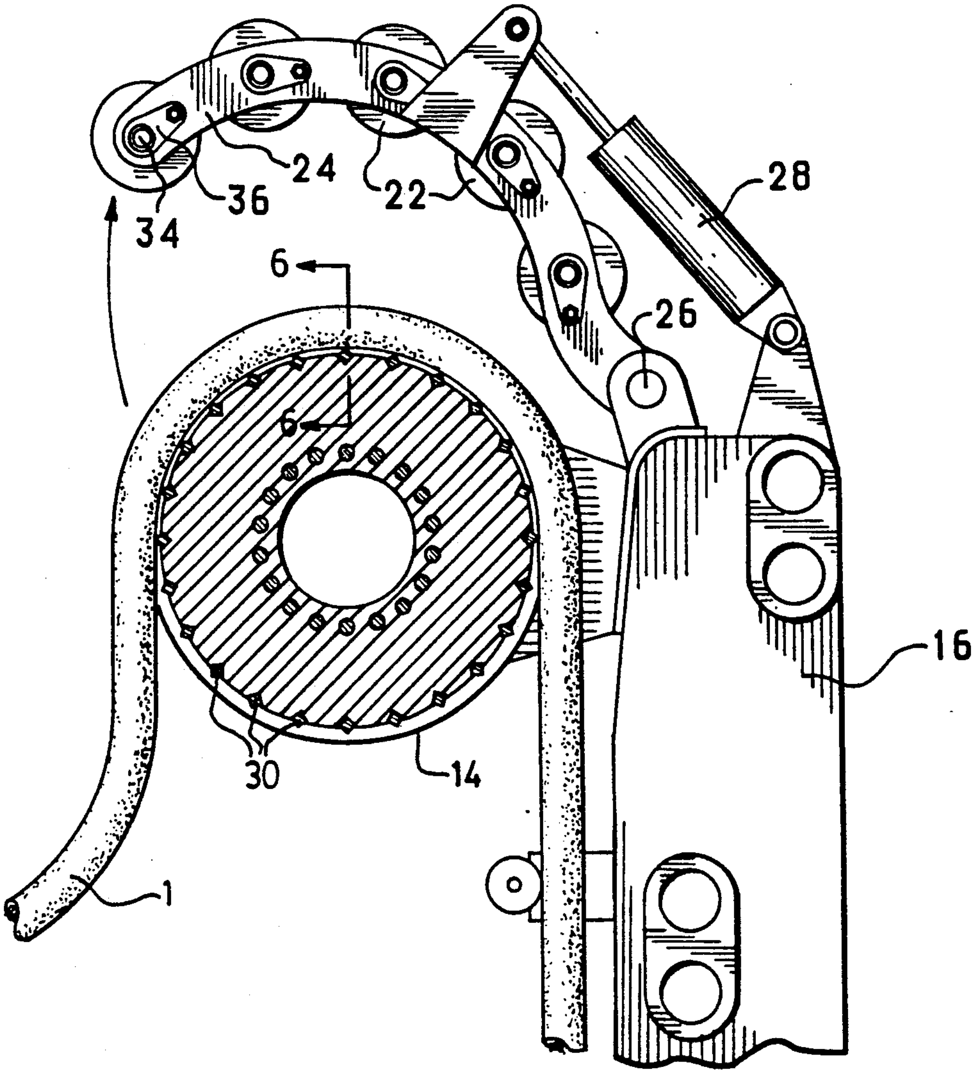
FIG. 5 is a side view of the cable pulling assembly, with the rollers in the open position, for insertion of the cable between the pulling wheel and the rollers.
Figure 6:
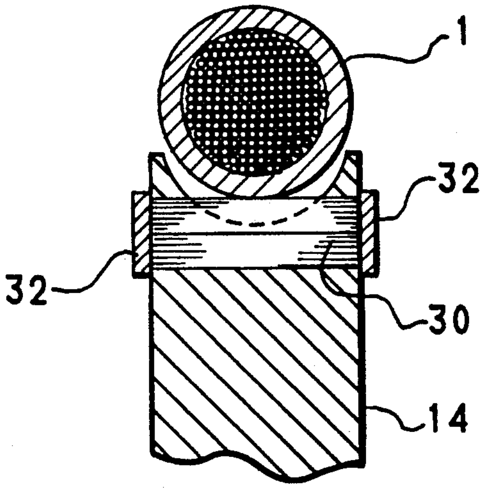
FIG. 6 is a cross-section at A—A in FIG. 5.
Figure 7:
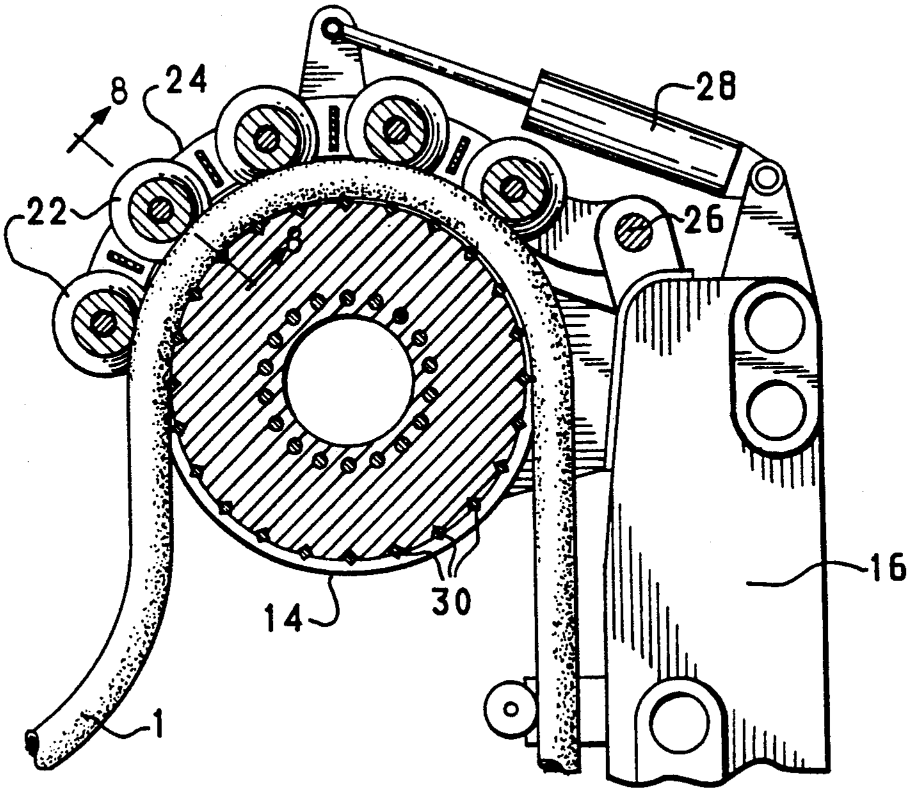
FIG. 7 is a side view of the cable pulling assembly, with the rollers in the closed position, forcing the cable against the pulling wheel.

The roller support arms are connected to each other and are pivotally mounted at one end to the blade support assembly 16, to rotate around a pivot pin 26. A hydraulic cylinder 28 mounted between the blade support assembly and the roller support arms is operable to move the roller support arms between an open position as shown in FIG. 5, so that the cable 1 may be inserted or removed, and a closed position as shown in FIG. 7.

Figure 8:
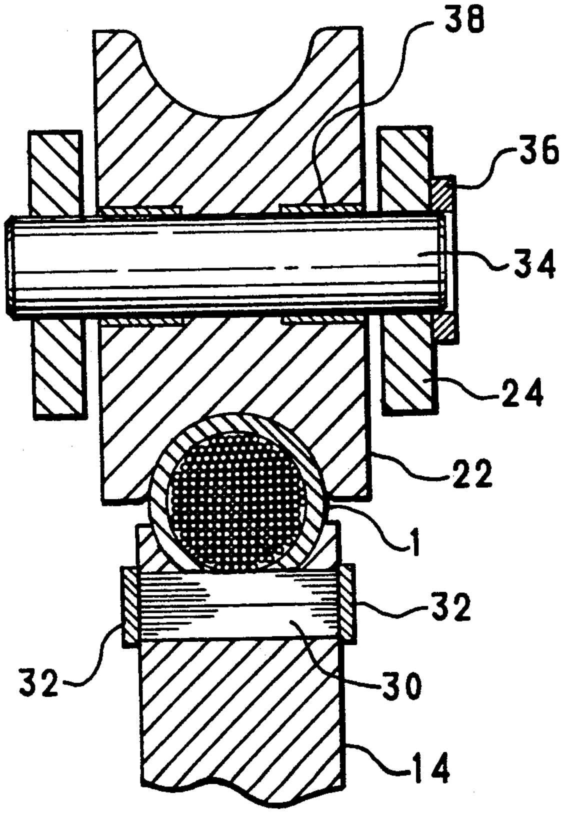
FIG. 8 is a cross-section at B—B in FIG. 7.

In the closed position, as seen in FIG. 8, the rollers 22 force the cable 1 into the grooved portion of the pulling wheel 14. The geometry is preferably established so that for a given cable diameter, the "pinch path" defined between the rollers and the pulling wheel gradually narrows as the cable progresses through the path. This tends to ensure that the pulling force is more evenly distributed along the pulling wheel, rather than being concentrated at the point where the cable enters the pinch path, i.e. at the first roller location. For a different cable diameter, this may necessitate either using a different set of rollers, and/or slightly different location for the pivot pin 26 if optimum performance is to be achieved. Preferably, therefore, the blade support assembly should be configured to allow for a variety of potential pivot pin positions.

For different cable diameters, it should also be appreciated that different pulling wheels may be necessary or desirable, to match the groove diameter to the cable diameter.

As seen best in FIGS. 5-8, positioned evenly around the circumference of the pulling wheel are some 24 square hardened steel rods 30, oriented such that one edge of each rod projects into the grooved area of the pulling wheel. These edges act as teeth which are forced into the cable by virtue of the rollers forcing the cable against them, to grip the cable securely as mentioned previously. The rods 30 are held in place by retention strips 32 on either side of the pulling wheel, the retention strips being simply bolted to the wheel at a few locations. Whenever the teeth become worn, i.e. when an edge of the square rods becomes worn, the retention strips can be removed, the rods can be rotated 90 degrees, so that each rod in effect goes through four usage cycles, making the teeth quite economical.

The depth of the blade is preferably adjustable relative to the blade support assembly, so that its depth in the ground may be readily adjusted without changing the height of the blade support assembly itself via hydraulic cylinder 46. This may be achieved, for example by using the adjustable blade holder arrangement described in U.S. Pat. No. 5,090,141 (Hall).

Once an initial length of cable is excavated and routed to the cable pulling assembly, it is readied for pulling by moving the roller support arms 24 to the open position shown in FIG. 5, inserting the cable, and then closing the roller support arms. The equipment is advanced along the line of the cable to dig the trench, preferably just a small distance above the cable, such as about a foot, and the cable pulling assembly is driven to pull the cable from the ground behind the advancing blade.

In the preferred embodiment, the blade support assembly is pivotally mounted on a support 40 at the end of a boom assembly 41. Cylinder 42 may be used to steer the blade support assembly, and hence the blade, or the assembly may be allowed to "float". The boom assembly is pivotally mounted on a further support 44. Cylinder 46 can raise or lower the boom assembly, and cylinder 48 can vary the angle of the support 40. Cylinder 50 allows the boom assembly to be steered, or it can be left to float as well. In normal operation, it would be common to allow the boom assembly to float, so that it can follow the blade, which would be steered manually or automatically.

Coordination of the cable pulling speed with the blade advancement speed is carried out so that the cable is pulled out behind the advancing blade. This may be done by manual speed adjustment by the operator, or may be automated.

What is claimed as the invention is:

1. Apparatus for the removal of cable buried in the ground, comprising a trenching plow blade suspended from a blade support assembly and means for pulling said blade support assembly to pull said blade through the ground above the cable, and mounted to said blade support assembly generally above the area of the blade, a cable-pulling assembly, said cable-pulling assembly comprising:

- a pulling wheel rotatably mounted to said blade support assembly, and means for driving said wheel;
- a plurality of rollers mounted between roller support arms, said roller support arms being connected to each other and pivotally mounted at one end to the blade support assembly;
- a hydraulic cylinder mounted between said blade support assembly and said roller support arms, operable to move said roller support arms between an open position in which the cable may be inserted or removed between said rollers and said pulling wheel, and a closed position in which said rollers force the cable against said pulling wheel; whereby cable may be pulled from the ground behind said blade by said cable-pulling assembly as said blade is advanced through the ground.

2. Apparatus as recited in claim 1, further comprising control means for coordination of the cable pulling speed with the speed of the blade through the ground, operatively connected to said means for driving said wheel.

3. Apparatus as recited in claim 1, further comprising means for adjusting the depth of the blade in the ground, connected between said blade and said blade support assembly.

4. Apparatus as recited in claim 1, further comprising means for steering said blade connected between said blade and said means for pulling said blade support assembly.

* * * * *